(12) United States Patent
McMurry et al.

(10) Patent No.: US 9,240,949 B2
(45) Date of Patent: Jan. 19, 2016

(54) METHODS, SYSTEMS AND COMPUTER READABLE MEDIA FOR PREDICTING OVERLOAD CONDITIONS USING LOAD INFORMATION

(71) Applicant: Oracle International Corporation, Redwood Shores, CA (US)

(72) Inventors: Sam Eric McMurry, Richardson, TX (US); Ben Allen Campbell, Irving, TX (US); Robert James Sparks, Plano, TX (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 180 days.

(21) Appl. No.: 13/956,300

(22) Filed: Jul. 31, 2013

(65) Prior Publication Data

US 2015/0036504 A1 Feb. 5, 2015

(51) Int. Cl.
*H04L 12/801* (2013.01)
*H04L 12/703* (2013.01)

(52) U.S. Cl.
CPC ............... *H04L 47/127* (2013.01); *H04L 45/28* (2013.01)

(58) Field of Classification Search
USPC ................................................. 370/229–240
See application file for complete search history.

(56) References Cited

U.S. PATENT DOCUMENTS

| | | | |
|---|---|---|---|
| 8,468,267 B2 | 6/2013 | Yigang et al. | |
| 8,601,073 B2 | 12/2013 | Craig et al. | |
| 8,879,431 B2 | 11/2014 | Ridel et al. | |
| 2003/0200277 A1 | 10/2003 | Kim | |
| 2007/0153995 A1 | 7/2007 | Fang et al. | |
| 2008/0250156 A1 | 10/2008 | Agarwal et al. | |
| 2009/0185494 A1 | 7/2009 | Li et al. | |
| 2009/0232011 A1 | 9/2009 | Li et al. | |
| 2010/0030914 A1 | 2/2010 | Sparks et al. | |

(Continued)

FOREIGN PATENT DOCUMENTS

| KR | 10-2009-0029348 | 3/2009 |
|---|---|---|
| WO | WO 2009/070179 A1 | 6/2009 |

(Continued)

OTHER PUBLICATIONS

Roach et al., "A Mechanism for Diameter Overload Control," draft-roach-dime-overload-ctrl-03, DIME, pp. 1-49 (May 17, 2013).

(Continued)

*Primary Examiner* — Awet Haile
*Assistant Examiner* — Kent Krueger
(74) *Attorney, Agent, or Firm* — Jenkins, Wilson, Taylor & Hunt, P.A.

(57) ABSTRACT

Methods, systems, and computer readable media for predicting imminent Diameter overload conditions using load information are disclosed. One embodiment of a system for implementing the subject matter described herein includes a first Diameter node including at least one network interface for receiving Diameter messages and a Diameter overload prediction unit. The Diameter overload prediction unit may be configured to extract load information from the Diameter messages, detect a traffic pattern using the extracted load information, predict at least one overload condition associated with one or more other Diameter nodes, and communicate an indication of the predicted overload condition to at least some of the other Diameter nodes before a time at which the overload condition is predicted to occur.

20 Claims, 5 Drawing Sheets

(56) References Cited

U.S. PATENT DOCUMENTS

| | | | |
|---|---|---|---|
| 2010/0211956 | A1 | 8/2010 | Gopisetty et al. |
| 2010/0299451 | A1 | 11/2010 | Yigang et al. |
| 2011/0040845 | A1* | 2/2011 | Cai et al. .................. 709/206 |
| 2011/0061061 | A1 | 3/2011 | Chen et al. |
| 2011/0090900 | A1 | 4/2011 | Jackson et al. |
| 2011/0116382 | A1 | 5/2011 | McCann et al. |
| 2011/0171958 | A1 | 7/2011 | Hua et al. |
| 2011/0202676 | A1 | 8/2011 | Craig et al. |
| 2011/0299395 | A1 | 12/2011 | Mariblanca Nieves |
| 2012/0044867 | A1 | 2/2012 | Faccin et al. |
| 2012/0087368 | A1 | 4/2012 | Kunarathnam et al. |
| 2012/0131165 | A1 | 5/2012 | Baniel et al. |
| 2012/0155389 | A1 | 6/2012 | McNamee et al. |
| 2012/0203781 | A1 | 8/2012 | Wakefield |
| 2012/0221445 | A1 | 8/2012 | Sharma |
| 2012/0221693 | A1 | 8/2012 | Cutler et al. |
| 2012/0303796 | A1 | 11/2012 | Mo et al. |
| 2012/0303835 | A1 | 11/2012 | Kempf et al. |
| 2012/0307631 | A1* | 12/2012 | Yang et al. .................. 370/230 |
| 2013/0039176 | A1 | 2/2013 | Kanode et al. |
| 2013/0124712 | A1 | 5/2013 | Parker |
| 2013/0163429 | A1 | 6/2013 | Dunstan et al. |
| 2013/0188489 | A1 | 7/2013 | Sato |
| 2013/0250770 | A1 | 9/2013 | Zou et al. |
| 2013/0275583 | A1 | 10/2013 | Roach et al. |
| 2014/0192646 | A1 | 7/2014 | Mir et al. |
| 2014/0376380 | A1 | 12/2014 | Campbell et al. |
| 2015/0036486 | A1 | 2/2015 | McMurry et al. |
| 2015/0036505 | A1 | 2/2015 | Sparks et al. |
| 2015/0085663 | A1 | 3/2015 | McMurry et al. |
| 2015/0149656 | A1 | 5/2015 | McMurry et al. |

FOREIGN PATENT DOCUMENTS

| | | |
|---|---|---|
| WO | WO 2011/161575 A1 | 12/2011 |
| WO | WO 2012/119147 A1 | 9/2012 |
| WO | WO 2012/130264 A1 | 10/2012 |
| WO | WO 2013/155535 A1 | 10/2013 |
| WO | WO 2015/017422 A1 | 2/2015 |
| WO | WO 2015/041750 A1 | 3/2015 |
| WO | WO 2015/080906 A1 | 6/2015 |

OTHER PUBLICATIONS

Korhonen et al., "The Diameter Overload Control Application (DOCA)," draft-korhonen-dime-ovl-01.txt, Diameter Maintenance and Extensions (DIME), pp. 1-18 (Feb. 25, 2013).

Fajardo et al., "Diameter Base Protocol," Internet Engineering Task Force (IETF), RFC 6733, pp. 1-152 (Oct. 2012).

Communication of European publication number and information on the application of Article 67(3) EPC for European Application No. 13776083.1 (Jan. 21, 2015).

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Notification of Transmittal of the International Search Report and the Written Opinion for of the International Searching Authority, or the Declaration for International Application No. PCT/US2014/048651 (Nov. 17, 2014).

Notification of Transmittal of the International Search Report and the Written Opinion of the International Searching Authority, or the Declaration for International Application No. PCT/US2014/048644 (Oct. 17, 2014).

Commonly-assigned, co-pending International Application No. PCT/US14/48651 for "Methods, Systems, and Computer Readable Media for Diameter Load and Overload Information and Virtualization," (Unpublished, filed Jul. 29, 2014).

Commonly-assigned, co-pending International Application No. PCT/US14/48644 for "Methods, Systems, and Computer Readable Media for Mitigating Traffic Storms," (Unpublished, filed Jul. 29, 2014).

Commonly-assigned, co-pending U.S. Appl. No. 14/034,478 for "Methods, Systems, and Computer Readable Media for Diameter Load and Overload Information and Virtualization," (Unpublished, filed Sep. 23, 2013).

Tschofenig, "Diameter Overload Architecture and Information Model," draft-tschofenig-dime-overload-arch-00.txt, DIME, pp. 1-9 (Jul. 16, 2013).

Notification of Transmittal of the International Search Report and the Written Opinion of the International.Searching Authority, or the Declaration for International Application No. PCT/US2013/036664 (Jul. 2, 2013).

Cambell, "Diameter Overload Control Solution Issues," draft-campbell-dime-overload-issues-00, pp. 1-16 (Jun. 2013).

"3rd Generation Partnership Project; Technical Specification Group Core Network and Terminals; Study on Diameter overload control mechanisms (Release 12)" 3GPP TR 29.809 V0.3.0, pp. 1-51 (Jun. 2013).

McMurry et al., "Diameter Overload Control Requirements," draft-ietf-dime-overload-reqs-00, pp. 1-25 (Sep. 21, 2012).

"OpenFlow Switch Specification," https://www.opennetworking.org/images/stories/downloads/sdn-resources/onf-specifications/openflow/openflow-spec-v1.2.pdf, Version 1.2 (Wire Protocol 0x03), Open Networking Foundation, pp. 1-85 (Dec. 5, 2011).

Calhoun et al., "Diameter Base Protocol," RFC 3588, pp. 1-147 (Sep. 2003).

Notification of Transmittal of the International Search Report and the Written Opinion of the International Searching Authority, or the Declaration for International Application No. PCT/US2014/066240 (May 13, 2015).

Non-Final Office Action for U.S. Appl. No. 13/956,304 (May 4, 2015).

Non-Final Office Action for U.S. Appl. No. 13/956,307 (Apr. 23, 2015).

Notice of Allowance and Fee(s) Due and Examiner-Initiated Interview Summary for U.S. Appl. No. 13/572,156 (Apr. 6, 2015).

Non-Final Office Action for U.S. Appl. No. 13/863,351 (Mar. 27, 2015).

Non-Final Office Action for U.S. Appl. No. 14/034,478 (Mar. 23, 2015).

Final Office Action for U.S. Appl. No. 13/572,156 (Dec. 29, 2014).

Non-Final Office Action for U.S. Appl. No. 13/572,156 (May 23, 2014).

"Split Architecture for Large Scale Wide Area Networks," SPARC ICT-258457 Deliverable D3.3, pp. 1-129 (Dec. 1, 2011).

3GPP, "Digital Cellular Telecommunications System (Phase 2+); Universal Mobile Telecommunications System (UMTS); Universal Subscriber Identity Module (USIM) Application Toolkit (USAT) (3GPP TS 31.111 version 8.3.0 Release 8)," ETSI TS 131 111 V8.3.0, pp. 1-102 (Oct. 2008).

\* cited by examiner

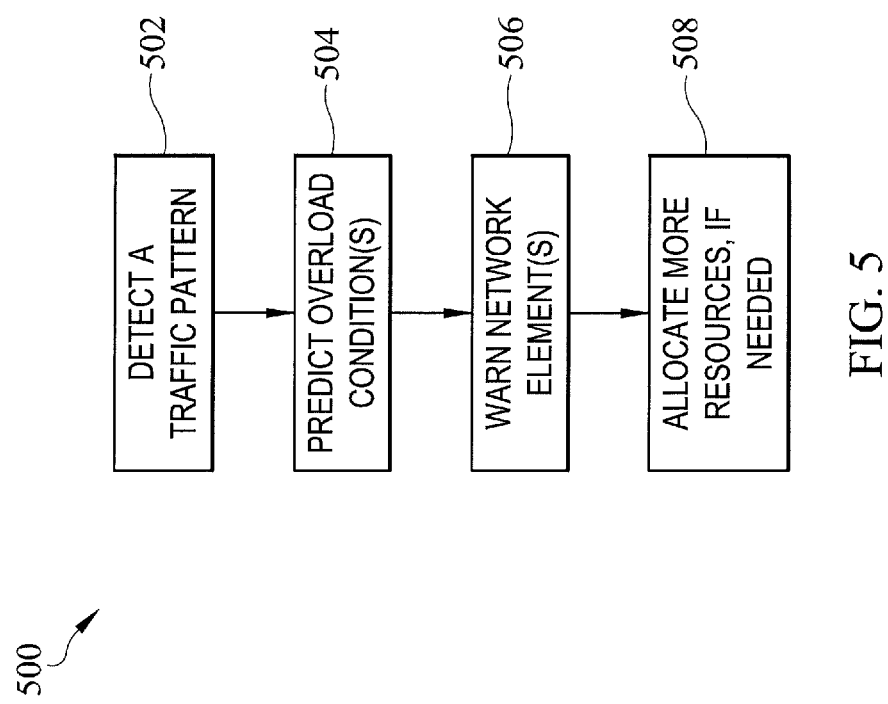

METHODS, SYSTEMS AND COMPUTER READABLE MEDIA FOR PREDICTING OVERLOAD CONDITIONS USING LOAD INFORMATION

TECHNICAL FIELD

The subject matter described herein relates to Diameter overload control. More particularly, the subject matter described herein relates to methods, systems, and computer readable media for predicting imminent Diameter overload conditions using load information.

BACKGROUND

Diameter is an authentication, authorization and accounting (AAA) protocol for computer networks, and is a successor to Radius. The Diameter base protocol is defined in International Engineering Task Force (IETF) request for comments (RFC) 6733 which is incorporated by reference herein in its entirety. Diameter messages use a per user framework and exist in the format of request-answer messages. Diameter answer messages travel back to the request source via the same path through which the request message was routed using hop-by-hop transport.

Diameter messages may be exchanged between Diameter nodes for performing various functions. For example, a mobility management entity (MME) and a home subscriber server (HSS) may interact for authentication, authorization, and/or accounting (AAA) purposes. Since communication networks use Diameter messages to perform a variety of functions, it is necessary to make sure Diameter nodes are working correctly and as expected, and to prevent and/or abate overload conditions from occurring at one or more Diameter nodes.

Diameter overload control is a mechanism by which a Diameter node indicates to other Diameter nodes that the reporting Diameter node is in an overloaded condition. The Diameter overload control mechanism may also be used to communicate existing load state information. Currently, there are two mechanisms proposed by the Diameter maintenance and extensions (DIME) working group of the Internet Engineering Task Force (IETF) for carrying and reporting overload conditions and load information within a network. The first mechanism is a piggy-backing mechanism that uses existing Diameter messages to carry overload conditions and/or load state information over the existing messages. This mechanism is specified in IETF Internet Draft draft-roach-dime-overload-ctrl-03, May 17, 2013, the disclosure of which is incorporated herein by reference in its entirety. The second mechanism uses Diameter application messages that are used only for communicating Diameter overload control information and/or load state information. This mechanism is specified in IETF Internet Draft draft-korhonen-dime-ovl-01.txt, Feb. 25, 2013, the disclosure of which is incorporated herein by reference in its entirety.

Using either mechanism, problems exist when overload conditions are not detected and/or reported quickly enough, resulting in one or more networks and/or elements thereof becoming slow, congested, and/or altogether stop working. Other problems occur when overload conditions onset quickly and/or occur suddenly. For example, when an abnormal event occurs within a highly populated area (e.g., a crime or tragic event occurs at a largely attended sporting event), people naturally reach for their phones to make emergency calls, exchange text messages, send/upload pictures, download videos, etc. This sudden onset of activity can overload networks and/or components thereof, and may cause the networks to get extremely sluggish and possibly fail.

Accordingly, in light of these difficulties, there exists a need for methods, systems, and computer readable media for predicting impending Diameter overload conditions using load information.

SUMMARY

Methods, systems, and computer readable media for predicting overload conditions using load information are disclosed. One embodiment of a system for implementing the subject matter described herein includes a first Diameter node including at least one network interface for receiving Diameter messages and a Diameter overload prediction unit. The Diameter overload prediction unit may be configured to extract load information from the Diameter messages, detect a traffic pattern using the extracted load information, predict at least one overload condition associated with one or more other Diameter nodes, and communicate an indication of the predicted overload condition to at least some of the other Diameter nodes before a time at which the overload condition is predicted to occur.

One embodiment of a method for predicting Diameter overload conditions using load information includes detecting a traffic pattern by examining load information obtained at a first Diameter node, predicting at least one overload condition associated with one or more nodes using the load information, and warning at least some of the nodes of the overload condition before a time at which the overload condition is predicted occur.

As used herein, the terms "node(s)" and "network element(s)" are synonymous and refer to an addressable entity within a Diameter network. A node may be all or a portion of a physical computing platform, such as a server with one or more processor blades or a single processor blade that implements a Diameter function, such as a Diameter signaling router (DSR), a home subscriber server (HSS), a mobility management entity (MME), a policy and charging rules function (PCRF), an application function (AF), a subscription profile repository (SPR), etc. A node may include one or more processors and memory that execute and store the instructions for implementing the node's particular Diameter function. A node may also be a virtual entity implemented by one or more processor blades.

As used herein, the term "overload" refers to a condition where a Diameter node needs a reduction in the number of requests that it must handle.

As used herein, the terms "load state information" and "load information" are synonymous and refer to information that indicates the load level, rate, throughput, or capacity at which a Diameter node or group of nodes is currently operating when not overloaded. Notably, such information may be used in predicting and preventing overload conditions.

As used herein, the term "overload control information" refers to information that indicates that a Diameter node or group of nodes is in an overloaded state or has transitioned from an overloaded state to a non-overloaded state.

The subject matter described herein for collecting and distributing Diameter overload control information may be implemented in hardware, software, firmware, or any combination thereof. As such, the terms "function" or "module" as used herein refer to hardware, software, and/or firmware for implementing the feature being described. In one exemplary implementation, the subject matter described herein may be implemented using a computer readable medium having stored thereon computer executable instructions that when executed by the hardware processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 5 is a flow chart illustrating an exemplary process for predicting Diameter overload conditions using load information according to an embodiment of the subject matter described herein.

DETAILED DESCRIPTION

In accordance with the subject matter disclosed herein, systems, methods, and computer readable media are provided for predicting Diameter overload conditions using load information. In some embodiments, traffic patterns identified using load information exchanged between nodes (e.g., sudden or uncharacteristic and/or abnormal spikes in load) may be used to predict inevitable Diameter overload conditions. Such conditions may be predicted to occur at a single node or at a group of nodes. The overload conditions may be predicted to occur at some time in the future. Predicting overload can advantageously contribute to improved Diameter overload control within a network, as preemptive overload control steps can be taken within a network to mitigate the overload conditions before they can occur. Diameter overload conditions occur when traffic, or a processing load, becomes greater than a node may or should handle. Notably, some aspects of the present subject matter described herein may be used for predicting Diameter overload conditions and preemptively implementing Diameter overload control actions or steps in advance of the predicted, imminent traffic occurring and/or overwhelming a network, or elements thereof.

For example and in some embodiments, a Diameter agent (e.g., a Diameter routing node (DRN) or a Diameter signaling router (DSR)) in accordance with aspects of the present subject matter described herein may detect or determine a traffic pattern using load information, and then apply reasoning to predict imminent overload. Some patterns, such as abnormal shifts or spikes in load at one or more nodes, may indicate inevitable future overload conditions. In this example, the Diameter agent that predicted the overload conditions may preemptively inform or warn one or more other nodes or network elements (e.g., an origination node) in the network to avoid the potential overload by sending affected Diameter messages to another node or by suspending affected communications. In some embodiments, the Diameter agent may notify a resource manager (e.g., a network manager or cloud manager) and attempt to preempt overload conditions from occurring and/or reduce the impact of overload by allocating more resources or adding capacity, before more resources become absolutely necessary. The other resources may include resources within the affected network, or resources from alternate, outside networks.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
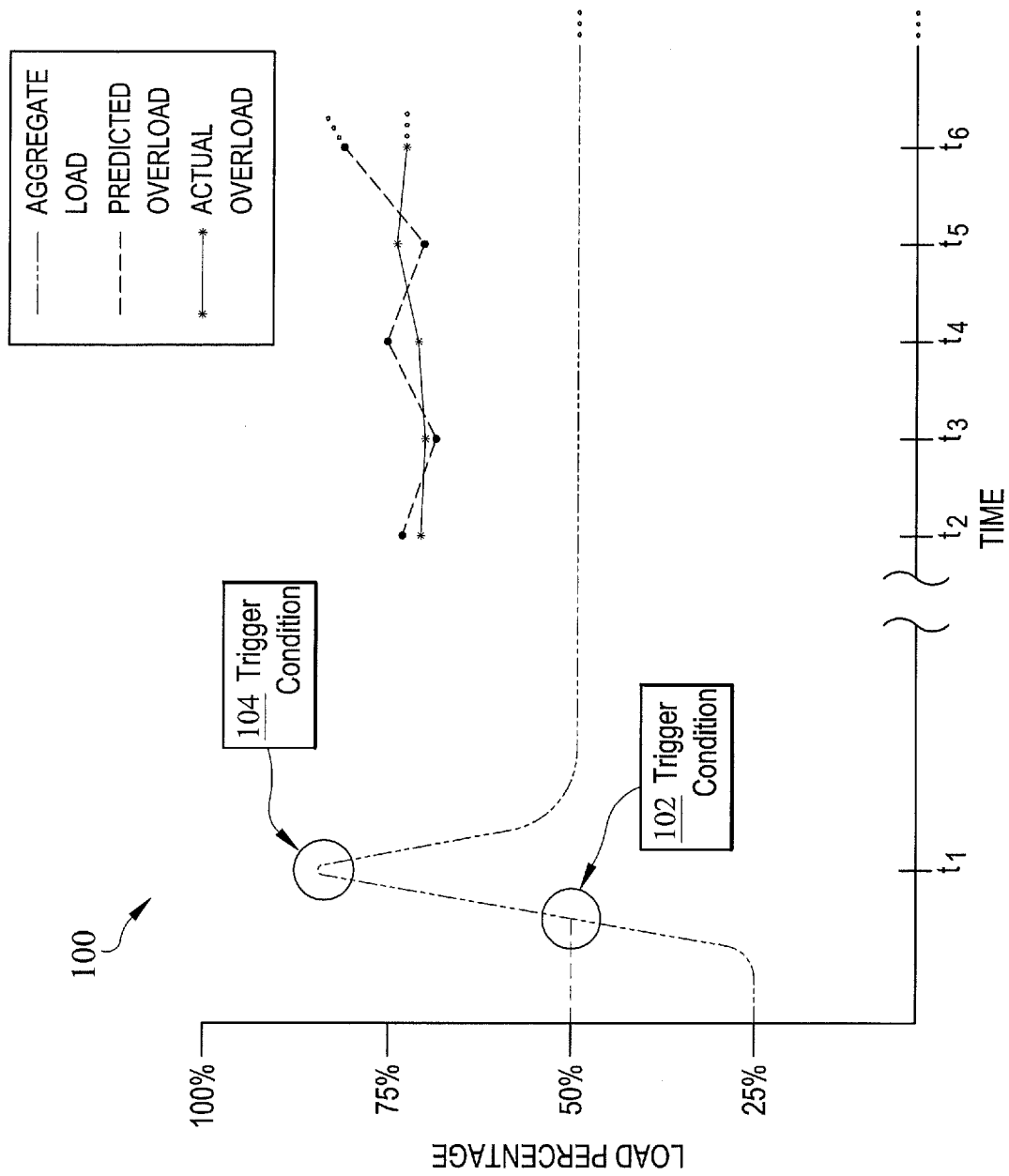
FIGS. 1 and 2 are graphical illustrations of traffic patterns associated with methods, systems, and computer readable media for predicting Diameter overload conditions using load information.
Figure 2:
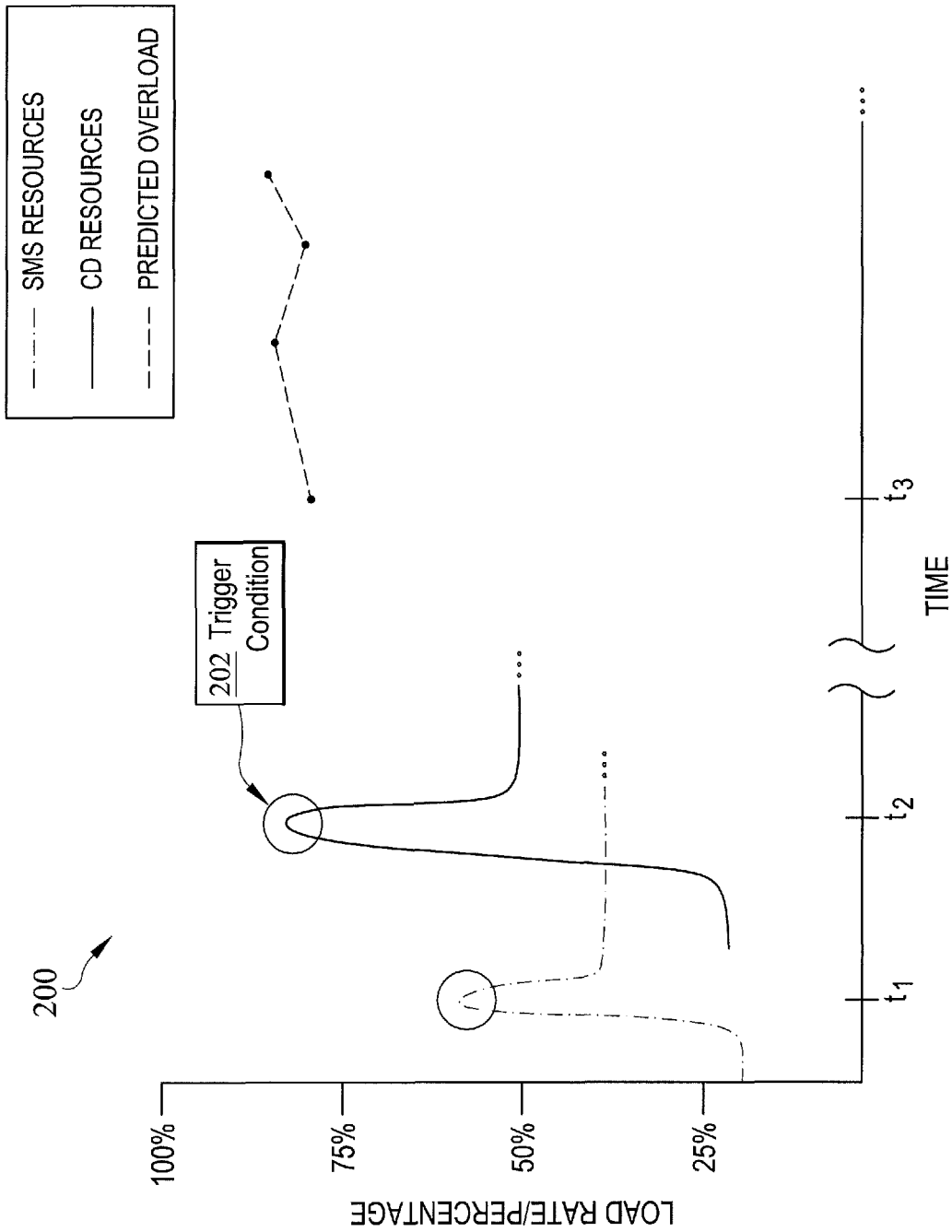

FIGS. 1 and 2 are graphical illustrations, generally designated 100 and 200, respectively, of exemplary traffic patterns for predicting Diameter overload conditions using load information, before the predicted overload conditions may occur. Notably, graphical illustrations 100 and 200 depict load information obtained from messages exchanged between nodes in a network over time, and illustrate one or more traffic patterns and/or triggering conditions, the occurrence of which may trigger an overload prediction and/or be used to predict overload conditions. In some embodiments, a Diameter node (e.g., Diameter agent 310, FIG. 3) may be configured to detect patterns in network traffic by extracting and/or examining load information carried within Diameter messages exchanged between one or more other Diameter nodes. The Diameter node (e.g., 310, Diameter agent FIG. 3) may apply predictive logical reasoning to the load information for predicting overload conditions before such conditions may occur. This advantageously allows Diameter overload control(s) to be put into place to mitigate or offset future overload conditions and/or to reduce the impact of future overload conditions within a network.

In some embodiments, load information may be stored in one or more attribute value pairs (AVPs) located in a payload portion of Diameter messages exchanged between multiple Diameter nodes. Load AVPs may contain any information for specifying load information or load metrics. In some embodiments, various algorithms may be used to generate load metrics. Some algorithms may generate load metrics that reflect utilization of resources. For example, load metrics may indicate a percentage of resources utilized or available at a Diameter node. In some embodiments, a load AVP may utilize an Unsigned32 data type format and may include a number between 0 and $2^{32}-1$ (4,294,967,295) for representing load, where 0 is "completely unloaded" and 4,294,967,295 is "maximum capacity". The load AVP may be extracted and an averaging and/or aggregating algorithm may be applied. The load information may then be monitored and used to predict future overload conditions which may occur at one or more nodes.

As FIGS. 1 and 2 illustrate, traffic patterns may occur over time with respect to load information, and such patterns may be monitored and used to predict overload. In some embodiments, overload conditions may be inevitable (i.e., and predictable), for example, when abnormal events occur at large population centers, and can be predicted by examining abnormal or irregular shifts or patterns in load information. Detecting traffic patterns may include detection of one or more triggering conditions, such as reaching or exceeding a threshold value including a predefined aggregate load of a plurality of nodes within a network. Detecting patterns may also include detection of specific load increases across one or more specific nodes, or groups of specific nodes. In some embodiments, optional signal processing may be used to detect complex patterns within the load information obtained over time.

As described hereinabove, load information, such as load AVPs, may be carried using one or more Diameter overload control mechanisms including a first piggy-backing mechanism where load information is piggy-backed over existing Diameter messages and/or a second mechanism utilizing one or more Diameter application messages that are specifically used for communicating Diameter overload control information and load state information. Notably, predicted overload conditions may be communicated to other nodes in a network causing other nodes to become aware of the impending overload conditions. In some aspects, a Diameter overload control AVP may be inserted within Diameter messages when overload conditions are predicted. In some embodiments, the mechanism by which other nodes obtain Diameter overload control information may include Diameter messages, SIP messages, web messages, or any other suitable protocol for carrying such information.

Referring to FIG. 1, in some embodiments a first Diameter node or agent (e.g., Diameter agent 310, FIG. 3) may be configured to extract and monitor load information transported via one of the carrying mechanisms described hereinabove. The load information may be converted into a load percent, rate, or throughput level associated with one or more nodes of a network. In some embodiments, the Diameter agent (e.g., Diameter agent 310, FIG. 3) may further be configured to collect load information associated with a plurality of nodes, and monitor an aggregate load as illustrated by FIG. 1. As FIG. 1 further illustrates, the Diameter agent (e.g., Diameter agent 310, FIG. 3) may be configured to predict overload upon reaching and/or exceeding one or more triggering conditions (e.g., threshold values or abnormal spike in data) based upon the aggregate load. That is, when a triggering condition occurs, an overload prediction may be made and communicated to other nodes and/or network operators.

In some embodiments, a first exemplary trigger or triggering condition 102 may include a simple predefined threshold value including percentage of aggregate load. Upon attaining the threshold value, an overload prediction may occur. For example, as FIG. 1 illustrates, where an aggregate load of one or more nodes of a network meets or exceeds a predefined percentage, such as 50%, then overload prediction(s) may be made.

In other embodiments, instead of using a predefined percentage as a threshold value or trigger, a second exemplary trigger or triggering condition 104 may include examining load data for patterns such as a sudden abnormal spike or change in aggregate load. Predicting overload conditions may include predicting an overloading percentage, throughput, or rate across one or more network elements or nodes at some time in the future, e.g., at times $t_2$ to $t_6$. Notably, overload may be predicted as indicated by FIG. 1 in response to load information exhibiting either first or second trigger conditions 102 and 104, respectively. Although not shown, triggers or triggering conditions may also be set using other criteria, such as predefined values or threshold values of first and/or second derivatives of load, or any other suitable criteria.

For illustration purposes only, exemplary first and second types of trigger conditions 102 and 104 are illustrated by FIG. 1; however, more than two types of triggering conditions are contemplated. In some embodiments, a predicted overload (e.g., illustrated in uniform broken lines) may be calculated using load information (e.g., illustrated in short/long dashed lines). The overload prediction may be triggered in response to meeting or exceeding a threshold value, such as at trigger condition 102 and/or in response to detecting an abnormal shift in load information such as at trigger condition 104. The predicted overload may be made in advance of times $t_2$ to $t_6$ (e.g., at which the predicted overload conditions are to occur) using the aggregate load information, such that overload controls may be put into place prior to reaching times $t_2$ to $t_6$. In some embodiments, an abnormal pattern is one that can be predictive of an impending overload condition.

In some embodiments, the present subject matter may advantageously mitigate or greatly reduce negative effects associated with imminent overload conditions, such that failure at nodes and/or of an entire network may be avoided. As FIG. 1 illustrates, the present subject matter may accurately predict overload at times $t_2$ to $t_6$, such that it is as close as possible to actual overload conditions (e.g., illustrated in solid lines) at times $t_2$ to $t_6$. In some embodiments, where an abnormal event occurs within a highly populated area (e.g., a sudden earthquake occurs in a large city) people reach for their phones, thereby causing a spike in aggregate load. This spike may trigger a prediction for overload conditions, and preemptive overload controls may be implemented before the predicted overload conditions may and/or do occur.

In some embodiments, trigger condition 102 may occur when aggregate load reaches a predefined percentage or threshold value. FIG. 1 indicates that an overload prediction is triggered upon an aggregate load of approximately 50% or more for one or more nodes in the network. Trigger condition 102 may be set to occur at less than or greater than 50%, as desired. In some embodiments, overload prediction may be triggered at an aggregate load of approximately 20% or more, approximately 30% or more, approximately 40% or more, approximately 50% or more, approximately 60% or more, or greater than approximately 75%. Any threshold value may be chosen as a trigger.

Aggregate load may be based upon throughput at one or more Diameter nodes including a mobility management entity (MME), a home subscriber server (HSS), an authentication, authorization, and accounting (AAA) server, a Bearer Binding and Event Reporting Function (BBERF), a serving gateway (SGW), a packet data network gateway (PDN GW), a charging data function (CDF), an online charging system (OCS), an offline charging system, a policy charging enforcement function (PCEF), a policy charging and rules function (PCRF), a subscriber profile repository (SPR), a Diameter agent, a network node, a policy engine, a policy server, an application function (AF), an application server, a Diameter signaling agent, a long term evolution (LTE) node, an Internet protocol (IP) multimedia subsystem (IMS) network node, a server, a correlation node, a node, a database, a signaling gateway, a gateway, a monitoring node, an edge node, a Diameter message processor, a data collection platform, a multi-protocol signaling gateway, a multi-protocol signaling router, or a computing platform. Aggregate load may also include an average throughput at any one node or any group of a plurality of nodes as defined by a network operator or manager.

In some embodiments, trigger condition 104 may include a pattern of one or more spikes occurring within load information, or any other unusual, irregular, or abnormal pattern occurring in detected aggregate load. As FIG. 1 further illustrates, a spike in aggregate load occurs at a first time $t_1$ triggering an overload prediction. Overload prediction may include predicting overload at any one node or group of nodes set to occur at or about subsequent times $t_2$ to $t_6$. Overload predictions may be made for a single node, (e.g., a specific gateway) or groups of nodes (e.g., a group of nodes configured to set up and establish voice calls). At time $t_1$, aggregate load jumps from about 25% to about 50%. Thus, overload conditions may be made at time $t_1$ as triggered by trigger condition 104, based upon either the abnormal pattern or spike in load, or based upon the sudden change in rate, or a derivative of load.

Notably, predicting overload at times $t_2$ to $t_6$ may allow Diameter overload controls to preemptively be put into place, such as implementation of back-off algorithms (e.g., queuing messages based on a certain ideal reception or transmission rate, pushback, or other techniques), rerouting messages to peers, deployment of sedation servers, increasing capacity at nodes within the network, allocating additional resources, combinations thereof, and/or any other suitable controls. Diameter overload controls may also include instructing a resource manager of a network, such as a network or cloud manager, to allocate more resources and/or increase capacity based upon the predicted overload conditions. Notably, the predicted overload conditions may be communicated to other nodes or network elements and overload control(s) can be put into place before a time at which the overload condition(s) is/are predicted to occur.

Referring to FIG. 2, in some embodiments, a Diameter node or agent (e.g., 310, FIG. 3) may be configured to obtain load information via a load AVP, convert the load AVP into an indication of load information (e.g., via applying aggregating algorithms, averaging algorithms, etc.), and detect traffic patterns within the load information. Detected patterns within load information may be used to accurately predict future overload conditions. In some embodiments, increases in the load rate, throughput, or percent across one or more specific nodes or groups of specific nodes may signify imminent and/or predictable overload conditions.

For example, FIG. 2 illustrates load information or data associated with a first group of nodes responsible for short message service (SMS) messaging (e.g., in dot-dashed lines) and data for a second group of nodes responsible for content delivery (CD), such as uploading and downloading videos (e.g., in solid lines). Spikes, jumps, or other abnormal patterns occurring in a plurality of resources may be indicative of future overload conditions. Thus, an exemplary trigger condition 202 may be set and applied where a traffic pattern is recognized, and may trigger an overload prediction.

For example and as described herein, when an abnormal event occurs within a highly populated area (e.g., a crime, natural disaster, or other tragic event occurs in a largely populated area), people naturally reach for their phones. People use their cellular phones to make emergency calls, exchange text messages (e.g., SMS messages), send/upload pictures (e.g., MMS messages), download videos, etc. This sudden onset of activity may be monitored over groups of specific nodes, and may appear as patterns or waves of traffic within a network. When multiple spikes or waves occur over specific nodes, such as illustrated by trigger condition 202, an overload prediction can be made, and preemptive overload controls may be put into place.

As FIG. 2 illustrates, a first spike in load information occurs across SMS resources at time $t_1$ and a second spike in load information occurs across CD resources at $t_2$. These two spikes may be indicative of a natural disaster or other abnormal event in which people automatically send quick text messages letting other know what is occurring, and then upload videos of the event. This pattern may be used to predict a future inevitable wave of voice calls and/or video downloads which could overload the network. Thus, overload prediction(s) occurring at trigger condition 202, or shortly thereafter, may be used to identify imminent overload conditions occurring across different nodes in the network. The overload conditions beginning at time $t_3$ may be calculated at or around the spike in CD resources in efforts to mitigate damage to the network caused by imminent overload conditions at other resources. Spikes, patterns, or abnormal/irregular load behavior for other media resources, such as resources for voice calls and/or MMSs could also be used for overload predictions.

In some embodiments, the SMS resources included in the first group of nodes which spike at $t_1$ may include one or more specific nodes and/or groups of nodes for signaling SMS messages such as one or more specific HSSs, HLRs, Diameter routers, switches, gateways, etc. In some embodiments, the CD resources included in the second group of nodes which spike at $t_2$ may include specific nodes and/or groups of nodes for uploading and/or downloading multimedia content, such as one or more specific Diameter clients, servers, switches, routers, base stations, Wi-Fi access points, etc. The subject matter herein may advantageously look at, detect, and/or become aware of patterns in load across different nodes associated with different types of media for predicting overload.

In some embodiments, the predicted load (e.g., illustrated in broken lines) may be predicted for a specific node or for specific groups of nodes. For example, the load predicted at time $t_3$ may be associated with signaling nodes for establishing and carrying voice calls. Preemptive overload controls can be put into place based upon the predicted overload conditions. For example, only messages associated with emergency calls or services (e.g., designated by a special AVP) may be allowed, traffic may be prioritized, offloaded, and/or additional resources may be allocated in response to the severity of the predicted overload.

Figure 3:
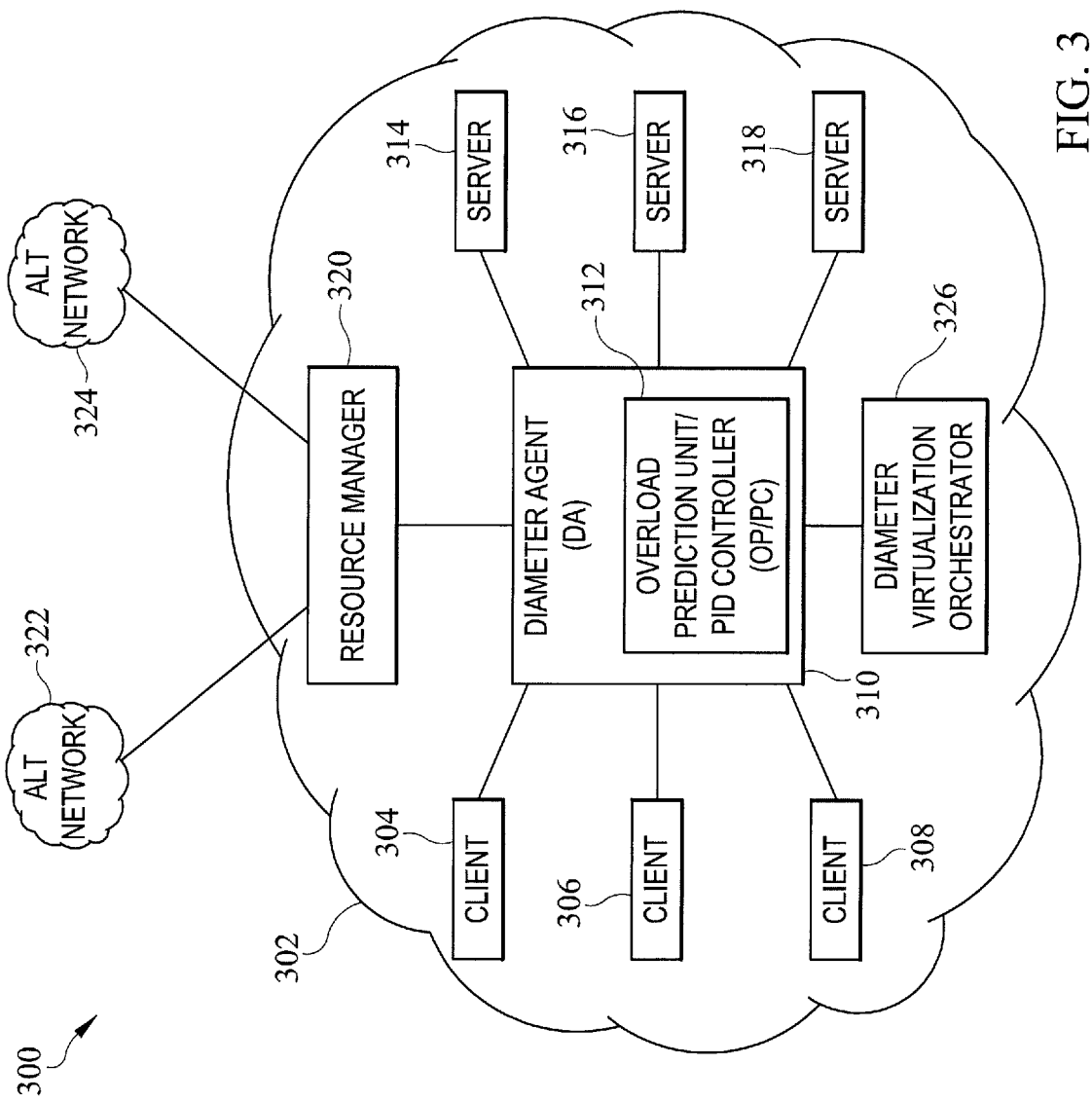
FIG. 3 is a network diagram illustrating a system for predicting Diameter overload conditions using load information according to an embodiment of the subject matter described herein.

FIG. 3 is a network diagram illustrating one embodiment of a system, generally designated 300, for predicting Diameter overload conditions using load information according to aspects of the subject matter described herein. Predicting overload conditions may be performed in response to detecting one or more patterns in traffic, or load data indicative of traffic, such as in response to detecting one or more abnormal spikes in load percent, rate, or throughput. Predicting overload conditions may also be performed in response to detecting a pattern that triggers a predefined threshold value, such as a predefined aggregate load percent. System 300 may include one or more networks, such as a first network 302 and may include one or more Diameter nodes, such as Diameter clients 304 to 308, a Diameter routing node (DRN) or Diameter agent (DA) 310, and Diameter servers 314 to 318.

Each of Diameter clients 304 to 308 may represent any suitable entity (e.g., a computing platform include at least one processor and memory) for requesting one or more services from Diameter servers 314 to 318. For example, Diameter client 304 may send a Diameter request message for requesting one or more services at an application hosted by Diameter server 314. Each of Diameter servers 314 to 318 may represent any suitable entity (e.g., a computing platform include at least one processor and memory) for providing or performing one or more services for Diameter clients 304 to 308. For example, Diameter server 314 may send a Diameter answer message (e.g. a Diameter response message) in response to receiving and processing a Diameter request message from client 304.

Exemplary Diameter clients 304 to 308 or Diameter servers 314 to 318 may include a MME, an HSS/HLR, an AAA server, a BBERF, a SGW, a PDN GW, a CDF, an OCS, an offline charging system, a PCEF, a PCRF, an SPR, a Diameter agent, a network node, a policy engine, a policy server, an AF, an application server, a Diameter signaling agent, an LTE node, an IP IMS network node, a server, a correlation node, a node, a database, a signaling gateway, a gateway, a monitoring node, a Diameter message processor, a data collection platform, a multi-protocol signaling gateway, a multi-protocol signaling router, or a computing platform.

DA 310 may include any suitable entity for aggregating load information and/or predicting overload conditions using load information. In some aspects, DA 310 may also preemptively implement Diameter overload control and/or related functions described herein in response to detecting one or more traffic patterns, and in response to predicting imminent overload conditions to occur at one or more Diameter nodes. DA 310 may include an overload prediction unit (OP) and/or a proportional-integral-derivative (PID) controller (PC), collectively designated "OP/PC" 312 as described further hereinbelow. Notably, OP/PC 312 may be configured to predict overload conditions using load information and optionally examine previous actions taken to prevent overload conditions via PID controller (PC) portion. Overload predictions may be updated as necessary in view of the previous actions. In some embodiments, DA 310 may be implemented on a computing platform with one or more hardware processors and one or more network interfaces for receiving or transmitting messages. Examples of DA 310 may include, but are not limited to, a DSR, a DRN, a Diameter routing agent (DRA), a Diameter relay agent, a Diameter redirect agent, a Diameter translation agent, or a Diameter proxy agent.

DA 310 may include functionality for receiving, processing and/or routing various messages (e.g., protocol data units (PDUs)) and may include various communications interfaces for communication with Diameter nodes as illustrated in solid lines, for example, communications interfaces may include 3rd Generation Partnership Project (3GPP) LTE communications interfaces and other (e.g., non-LTE) communications interfaces. In some embodiments, receiving, processing, and/or routing functionality may be included in one or more modules. For example, DA 310 may include or have access to one or more modules for receiving Diameter signaling messages associated with multiple different Diameter signaling interfaces, e.g., S9, S6a, S11, Cx, and Dx.

In some embodiments, DA 310 may receive and/or send Diameter messages via other Diameter interfaces. For example, DA 310 may receive and/or send Diameter messages via an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

DA 310 may facilitate communication between Diameter clients 304 to 308 and Diameter servers 314 to 318. For example, Diameter client 304 may send a Diameter request message (e.g., a Diameter session establishment request message) to DA 310. The Diameter request message may require one or more services from Diameter servers 314. DA 310 may route, relay, and/or translate requests or responses between Diameter client 304 and a Diameter server 314. After receiving and processing the Diameter request message, Diameter server 314 may send a Diameter response message (e.g., a Diameter session establishment response message) to DA 310. The Diameter response message may be in response to a Diameter request message originated by Diameter client 304. DA 310 may provide the Diameter response message to Diameter client 304.

Notably, DA 310, or a module therein such as OP/PC 312, may be configured to extract load information, such as a load AVP, and predict overload using the load information when load increases, spikes, exhibits a learned pattern known to result in embodiments, DA 310, or a module therein such as OP/PC 312, may apply predictive reasoning to predict impending overload conditions. In some embodiments, the load information may be examined to determine a rate of load increase, with a particular rate triggering some behavior. In some embodiments, overload conditions may be predicted in response to an increase in aggregate load up to and/or in excess of a predefined aggregate load. Signal processing can be applied to load information to detect complex patterns over time. In some embodiments, upon predicting overload conditions, DA 310, or a module therein, may modify the Diameter messages by inserting or including Diameter overload control information or other related data in the modified Diameter message. In some embodiments, Diameter overload control information may be stored in one or more AVPs located in a payload portion of the modified Diameter message.

In some embodiments, OP/PC 312 may include any suitable entity (such as a module or software executing on a hardware processor) for extracting/examining load information, performing overload predictions, performing overload control, overload management, and/or related functions. For example, OP/PC 312 may be configured to extract load information, detect a traffic pattern using the load information, predict at least one overload condition associated with one or more Diameter nodes (e.g., servers 314 to 318), and communicate an indication of the predicted overload condition to one or more other Diameter nodes (e.g., clients 304 to 308) before a time at which the overload condition(s) is/are predicted to occur.

In response to receiving an indication of predicted overload condition(s), Diameter nodes become overload aware, and may perform one or more actions to lessen or abate the predicted load increase in the network 302, or network elements thereof. For example, in some embodiments, Diameter servers 314 to 318 may become aware of the potential for overload, such that servers 314 to 318 may be configured to push back on received traffic by sending overload indications to peers. In other embodiments, Diameter clients 304 to 308 may become aware of the potential for overload, such that clients 304 to 308 may be configured to perform one or more actions to lessen or abate load at Diameter sessions. Exemplary actions may include client prioritization of certain types of requests over others, selection of an alternate peer (e.g., as long as the overload properties of that peer are honored) for processing, sending an error message, or dropping or discarding the Diameter message.

In some embodiments, OP/PC 312 includes a PID controller (PC) for using feedback based information when making overload predictions, such that previous actions may be accounted for when predicting overload.

OP/PC 312 may be configured to monitor or detect load information from one or more Diameter nodes by examining load AVPs and converting the load AVPs into useful indicators of load (e.g., a percentage or rate). The load information and/or load AVP may give an indication of a load level and/or throughput at which one or more nodes are currently operating. Spikes or other abnormal patterns in load data may trigger an overload prediction. OP/PC 312 may subscribe to Diameter servers 314 to 318, or OP/PC 312 of DA 310 may periodically or aperiodically (e.g., dynamically based on certain factors) poll Diameter servers 314 to 318 for load information. In this example, when DA 310 including OP/PC 312 predicts an overload condition using load information, DA 310 and/or OP/PC 312 may send messages to each of Diameter clients 304 to 308 informing clients of the predicted load, for preemptively implementing Diameter overload controls by performing one or more actions to lessen or abate load at Diameter servers.

In some embodiments, when sending a response to a node that supports overload control or overload management, a node (e.g., DA 310, clients 304 to 308, or one of Diameter servers 314 to 318) may include one or more overload related AVPs to warn or inform other network elements and/or network operators (e.g., OSSs) of the predicted overload. Thus, Diameter overload controls can be preemptively started in advance of an actual occurrence thereof. This can advantageously lessen the burden at one or more nodes across network 300, and avoid the failure and/or severe congestion thereof.

In some embodiments, Diameter clients 304 to 308 may take various preemptive actions in response to being informed or warned of predicted overload for one or more upstream nodes (e.g., DA 310 or one of Diameter servers 314 to 318). For example, clients 304 to 308 may prioritize certain types of requests over others (e.g., prioritize emergency calls using an AVP) and/or selection and/or offloading traffic to one or more alternate peers or sedation servers. The peers or sedation servers may be configured to process the request and either send an error message or drop/discard the Diameter message. In some embodiments, Diameter clients 304 to 308 may perform any actions necessary to shape traffic according to predicted overload control procedures, such as load abatement procedures provided in an Overload-Control-Metric AVP. In some embodiments, Diameter clients 304 to 308 may use predicted Diameter overload control information when selecting a most desirable (e.g., the one predicted to be least-loaded) Diameter server 314 to 318.

In some embodiments, DA 310 may take various actions in response to learning an upstream node (e.g., one of Diameter servers 314 to 318) is overloaded. Exemplary actions may include instructing a client to perform one or more actions, prioritization of certain types of requests over others, selection of an alternate peer or sedation server, sending an error message (e.g., a DIAMETER_UNABLE_TO_DELIVER message, a DIAMETER_PEER-_IN_OVERLOAD message, a Diameter_TOO_BUSY message, or a transient failure message), or dropping or discarding the Diameter message. In some embodiments, Diameter clients 304 to 308 may perform any actions necessary to shape traffic according to predicted overload control information, such as metrics provided in an Overload-Control-Metric AVP. In some embodiments, DA 310 may use Diameter overload control information in selecting a desirable (e.g., the one predicted to be least-loaded) Diameter server 314 to 318.

While FIG. 3 depicts DA 310 communicating with (e.g., receiving Diameter messages from) various Diameter nodes, it will be appreciated that DA 310 may also communicate with the nodes depicted and other nodes (not depicted) via additional and/or different interfaces. It will also be appreciated that DA 310 may include fewer, additional, and/or different modules and/or components.

Notably, DA 310 advantageously includes OP/PC 312 configured for monitoring load information and detecting patterns in load data, thereby triggering an overload prediction. In some embodiments, DA 310 may be configured to notify a resource manager 320 regarding the predicted imminent overload conditions. The resource manager may preemptively allocate more resources via peers in network 302 or may utilize resources residing in one or more alternate (ALT) networks, such as a first ALT network 322 or a second ALT network 324.

Another action that may be performed in response to prediction of an overload condition is to communicate the indication of the predicted overload condition to a Diameter virtualization orchestrator 326. Diameter virtualization orchestrator 326 may, in response to receiving the indication of the predicted overload condition, dynamically allocate network resources to handle the predicted overload condition. Such dynamic allocation may be effected using virtualization and/or software defined network (SDN) technologies. In one example, Diameter virtualization orchestrator 326 may allocate additional hardware resources to virtual servers that serve clients 304, 306, and 308. In another example, Diameter virtualization orchestrator 326 may issue software defined network (SDN) commands, such as OpenFlow commands, to route traffic around the nodes where overload is predicted to occur.

Figure 4:
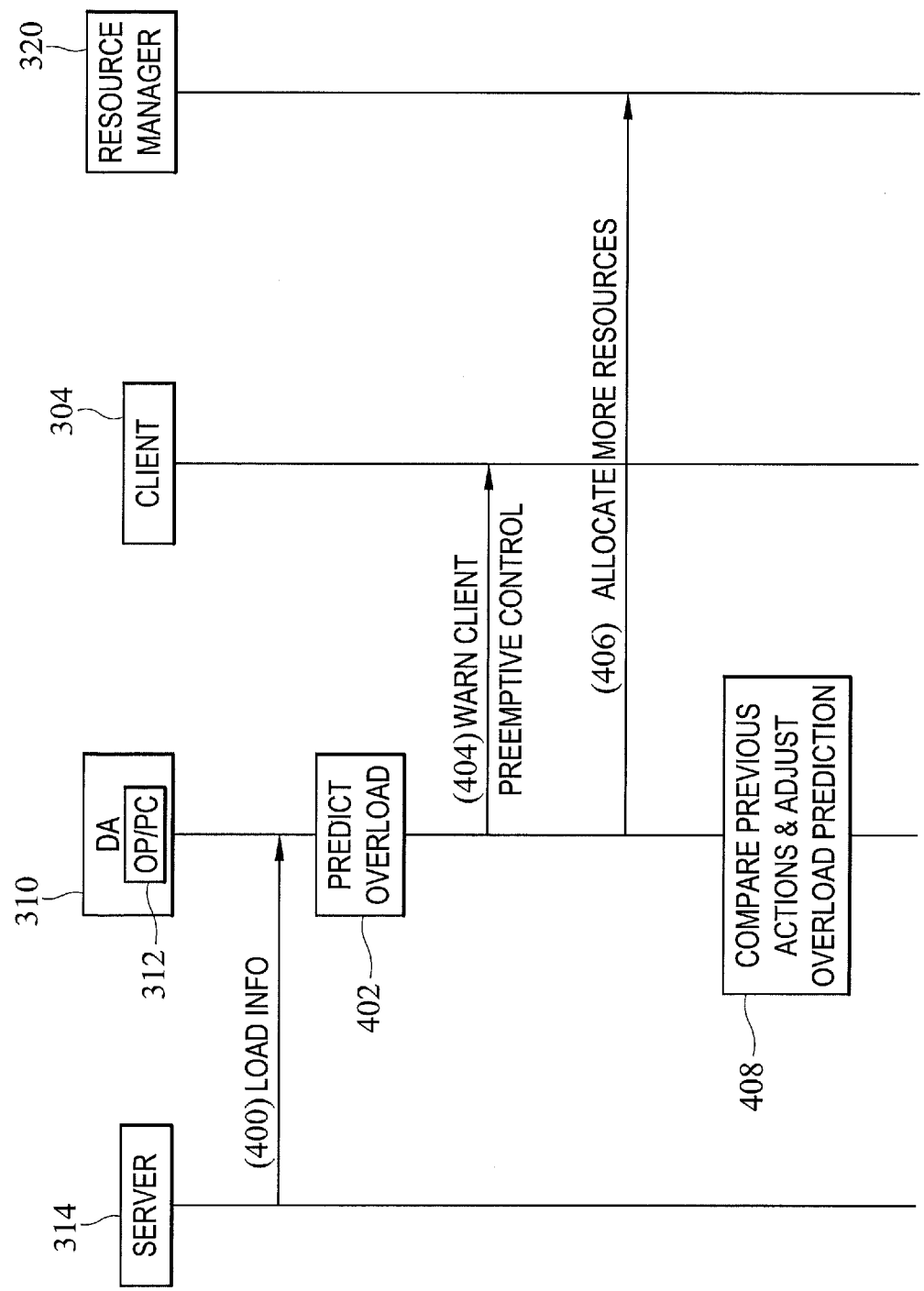
FIG. 4 is a message flow diagram illustrating exemplary messaging for predicting Diameter overload conditions using load information according to an embodiment of the subject matter described herein.

FIG. 4 is a message flow diagram illustrating exemplary messaging for predicting Diameter overload conditions using load information according to an embodiment of the subject matter described herein. At line 400, DA 310 receives a message from server 314 directed to client 304. DA 310 extracts load information, such as a load AVP contained within the message. At block 402, OP/PC 312 of DA 310 predicts overload using the load information. In some embodiments, OP/PC 312 applies an algorithm adapted to aggregate load information received from a plurality of nodes. In other embodiments, OP/PC 312 may apply an algorithm adapted to average load information for one specific node a group of nodes (e.g., SMS resources, voice call resources, CD resources, MMS resources, etc.).

In some embodiments, predicting overload at block 402 may be performed in response to a trigger or triggering criterion based upon load information. For example, DA 310 including OP/PC 312 may predict overload when an aggregate load reaches or exceeds a certain percent or threshold value. In other embodiments, DA 310 including OP/PC 312 may predict overload in response to detecting a traffic pattern based upon load information. For example, where load across SMS resources jumps or spikes and is followed by a spike across CD resources, an overload prediction may be triggered as this may be indicative of an abnormal event occurring in a highly populated area (e.g., a terror attack) which could potentially generate enough media traffic to overload a network. In some embodiments, spikes across one or more groups of nodes including spikes across one or more of SMS resources, MMS resources, voice call resources, CD resources, etc., are contemplated.

At line 404, DA 310 including OP/PC 312 may warn client 304 and/or implement one or more forms of Diameter overload control. For example, in some embodiments, DA 310 may insert a Diameter overload control AVP in response to predicting imminent overload conditions at one or more other network nodes. Client 304 may receive the message with the Diameter overload AVP, and implement Diameter overload control including implementation of one or more back-off algorithms, offload traffic to peers, etc. In some embodiments, DA 310 may inform other nodes (e.g., any of clients 304 to 308, any of servers 314 to 318, and/or any other nodes of network 300) for informing such nodes of predicted overload conditions. In response to receiving an indication of predicted overload (e.g., a message with a Diameter overload AVP), the other nodes may offload traffic to peers and/or sedation servers, prioritize traffic, drop calls, send error messages, etc. for minimizing effects of the predicted imminent overload conditions.

As noted herein, warning client at line 404 may include insertion of a Diameter overload AVP by DA 310 and/or OP/PC 312 in the message directed towards client 304. Client 304 may utilize Diameter overload control AVPs for selecting among several equivalent servers to avoid the server predicted to be overloaded in the future. In another example, information provided in Diameter overload AVP may be used by peers to independently implement back-off algorithms (e.g., queuing messages based on a certain ideal reception or transmission rate, pushback, or other techniques). In some embodiments, the Diameter overload AVP may include an amount by which one or more nodes are predicted to become overloaded. For example, server 314 may be predicted to become overloaded by 20%, thus the Diameter overload AVP may be set to 20. Diameter clients and/or DA 310 including OP/PC 312 may then distribute and allocate load according to Diameter load AVPs. At line 404, the mechanism by which nodes obtain Diameter overload control information from DA 310 may include Diameter messages, SIP messages, web messages, or any other suitable protocol for carrying such information.

At line 406, DA 310 may optionally generate and route a request to resource manager 320 (and/or a network operator) for allocating more resources to mitigate effects of impending overload conditions. Resource manager 320 may bring additional resources online in response to the predicted overload conditions. For example, resource manager 320 may allocate more gateways, switches, registration nodes, etc., as needed. The other resources may be allocated from the same network as DA 310, or from different networks, as needed (e.g., ALT networks 322, 324, FIG. 3).

At block 408, OP/PC may compare previous actions and adjust the overload prediction as necessary. For example, PID controller (PC) may be configured to examine stored feedback information and adjust overload controls and/or overload prediction in response to examining prior actions taken to offset or mitigate predicted overload.

FIG. 5 is a flow chart illustrating an exemplary process, generally designated 500, for predicting Diameter overload conditions using load information according to an embodiment of the subject matter described herein. Referring to FIG. 5, at block 502 a traffic pattern is detected. As illustrated in FIGS. 1 to 4 hereinabove, in some embodiments DA 310 (FIGS. 3, 4) may include an overload prediction unit/PID controller, collectively referred to as an "OP/PC" (FIGS. 3, 4) for extracting load information from Diameter messages exchanged between nodes in a network and monitoring the load information. The load information may include traffic patterns, such as sudden increases and/or spikes PR shifts in load occurring at one or more nodes. Sudden spikes or shifts may be indicative of impending overload conditions, which may be predicted at block 504. The overload conditions may be predicted at a time that the traffic pattern is detected, or shortly thereafter, and in advance of actually being allowed to naturally occur and overload the network. In this regard, overload conditions are avoided or substantially mitigated by warning other nodes to back off or offload traffic, or by allowing a resource manager or network operator to allocate more resources.

In block 506, network elements or nodes are warned of impending or imminent overload. In some embodiments, DA (e.g., 310, FIGS. 3, 4) may warn nodes or network elements of the imminent overload conditions. The nodes may then adjust traffic flows to avoid the overload. In some embodiments, DA (e.g., 310, FIGS. 3, 4) may insert a Diameter overload control AVP such that other nodes in the network become aware of predicted imminent overload. The mechanism by which nodes obtain Diameter overload control information from DA (e.g., 310, FIG. 3) may include Diameter messages, SIP messages, web messages, or any other suitable protocol for carrying such information.

In block 508, additional resources may be optionally allocated, if needed. In some embodiments, allocating additional resources can include increasing capacity at existing nodes deemed affected by the predicted overload. DA (e.g., 310, FIGS. 3, 4) may signal or request more resources from a resources manager of a network. The network manager may then allocate additional resources within the network, secure additional resources via network virtualization, and/or contact alternate resources for handling the predicted overload.

By collecting, monitoring, and/or otherwise utilizing Diameter load information to predict overload conditions of one or more nodes, the potential problem of overloaded nodes and/or network failure in response to abnormal events occurring in highly populated areas may be preemptively eliminated, mitigated, or significantly reduced. In response to becoming aware of the potential overload conditions, Diameter nodes may utilize peers and/or other entities in alternate networks. Thus, preemptive Diameter overload control(s) may be implemented via communicating overload information to one or more nodes in the network and increasing awareness of the imminent overload conditions.

While the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for predicting Diameter overload conditions using load information, the system comprising:
a first Diameter node including:
at least one network interface for receiving Diameter messages exchanged between a plurality of Diameter nodes; and
a Diameter overload prediction unit configured to extract load information from the Diameter messages, convert the load information into a load metric that reflects utilization of one or more of the plurality of Diameter nodes, and detect a traffic pattern associated with the load metric over a period of time, wherein the Diameter overload prediction unit is configured to predict at least one overload condition associated with one Diameter node of the plurality of Diameter nodes based upon the detected traffic pattern, and communicate an indication of the predicted overload condition to at least some other Diameter nodes of the plurality of Diameter nodes before a time at which the at least one overload condition is predicted to occur, wherein the indication of the predicted overload condition includes a numerical amount by which the one Diameter node is predicted to be overloaded,
wherein the indication of the predicted overload condition comprises a Diameter overload control attribute value pair (AVP) communicated to at least some of the other Diameter nodes and wherein the Diameter overload control AVP is set to the amount by which the one Diameter node is predicted to become overloaded.

2. The system of claim 1, wherein the first Diameter node includes a Diameter agent (DA), a Diameter signaling router (DSR), a Diameter routing node (DRN), a Diameter routing agent (DRA), a Diameter relay agent, a Diameter redirect agent, a Diameter translation agent, or a Diameter proxy agent.

3. The system of claim 1, wherein the traffic pattern comprises reaching or exceeding a predefined threshold value associated with an aggregate load.

4. The system of claim 1, wherein the traffic pattern comprises a spike in a processing load associated with at least one node.

5. The system of claim 1, wherein the traffic pattern comprises a spike in a processing load associated with at least one group of nodes.

6. The system of claim 1, wherein the Diameter overload prediction unit is configured to communicate the indication of predicted overload condition to a Diameter overload virtualization orchestrator that dynamically allocates network resources to handle the predicted overload condition.

7. The system of claim 1, wherein the load information is carried in an attribute value pair (AVP).

8. The system of claim 1, wherein, in response to receiving the indication of the predicted overload condition, at least some of the other Diameter nodes perform one or more actions to lessen or abate the predicted overload condition.

9. The system of claim 8, wherein the actions include pushing back on received traffic by sending overload indications to peers or a sedation server.

10. The system of claim 8, wherein the actions include prioritization of certain types of requests over others, dropping, or discarding the Diameter message.

11. A method for predicting Diameter overload conditions using load information, the method comprising:
receiving Diameter messages exchanged between a plurality of Diameter nodes;
extracting load information from the plurality of Diameter nodes;
converting the load information into a load metric that reflects utilization of one or more of the plurality of Diameter nodes;
detecting a traffic pattern associated with the load metric over a period of time;
predicting at least one overload condition associated with a first Diameter node of the plurality of Diameter nodes based upon the detected traffic pattern; and
warning at least some other Diameter nodes of the plurality of Diameter nodes of the overload condition before a time at which the overload condition is predicted to occur, wherein the warning includes a numerical amount by which the first Diameter node is predicted to be overloaded,
wherein warning at least some of the nodes comprises inserting a Diameter overload control attribute value pair (AVP) into Diameter messages signaled to at least some of the nodes, wherein the Diameter overload control AVP is set to the amount by which the first Diameter node is predicted to become overloaded.

12. The method of claim 11, wherein detecting the traffic pattern comprises detection of reaching or exceeding a predefined threshold value associated with an aggregate load.

13. The method of claim 11, wherein detecting the traffic pattern comprises detecting a spike in the load information associated with at least one node.

14. The method of claim 11, wherein detecting the traffic pattern comprises detecting a spike in the load information associated with at least one group of nodes.

15. The method of claim 11, further comprising communicating the at least one overload condition to a Diameter overload virtualization orchestrator that dynamically allocates network resources to handle the predicted overload condition.

16. The method of claim 11, wherein predicting at least one overload condition includes applying signal processing to detect complex patterns within the load metric obtained over time.

17. The method of claim 11, wherein, in response to receiving the Diameter overload control AVP, at least some of the nodes perform one or more actions to lessen or abate the predicted overload condition.

18. The method of claim 17, wherein the actions include pushing back on received traffic by sending overload indications to peers or a sedation server.

19. The method of claim 17, wherein the actions include prioritization of certain types of requests over others, dropping, or discarding the Diameter message.

20. A non-transitory computer readable medium having stored thereon computer executable instructions embodied in a computer readable medium and when executed by a processor of a computer cause the computer to perform steps comprising:
receiving Diameter messages exchanged between a plurality of Diameter nodes;
extracting load information from the plurality of Diameter nodes;
converting the load information into a load metric that reflects utilization of one or more of the plurality of Diameter nodes;
detecting a traffic pattern associated with the load metric over a period of time;
predicting at least one overload condition associated with a first Diameter node of the plurality of Diameter nodes based upon the detected traffic pattern; and warning at least some other Diameter nodes of the plurality of Diameter nodes of the overload condition before a time at which the overload condition is predicted to occur, wherein the warning includes a numerical amount by which the first Diameter node is predicted to be overloaded, wherein warning at least some of the nodes comprises inserting a Diameter overload control attribute value pair (AVP) into Diameter messages signaled to at least some of the nodes, wherein the Diameter overload control AVP is set to the amount by which the first Diameter node is predicted to become overloaded.

\* \* \* \* \*